Dec. 2, 1952 R. R. LOVE 2,620,203
OSCILLATING WHEEL ASSEMBLY
Filed Oct. 28, 1949 2 SHEETS—SHEET 1
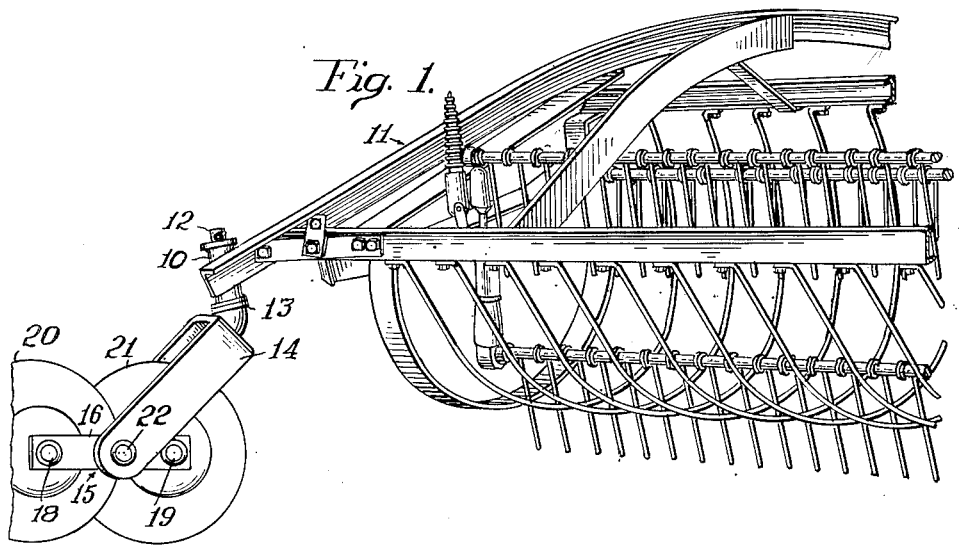
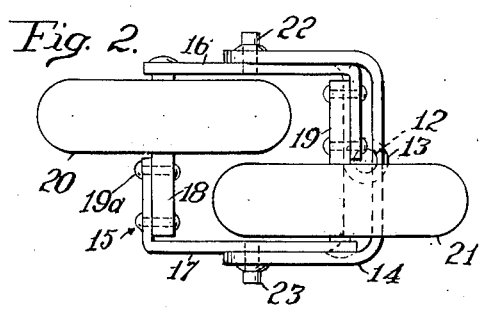
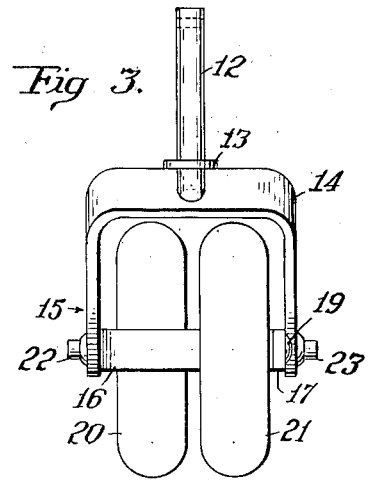
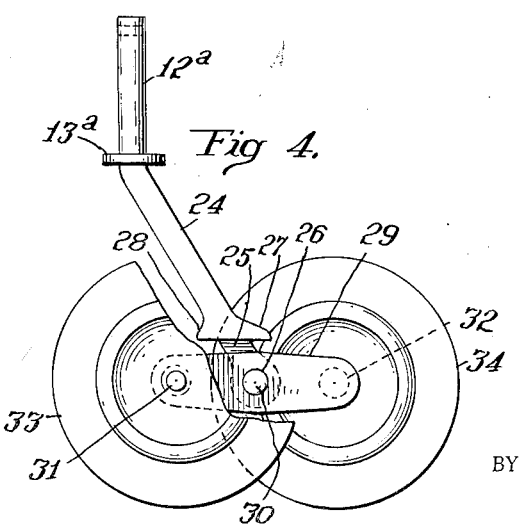
INVENTOR
*Richard R. Love*
BY
*Munn, Liddy & Flaccum*
ATTORNEYS

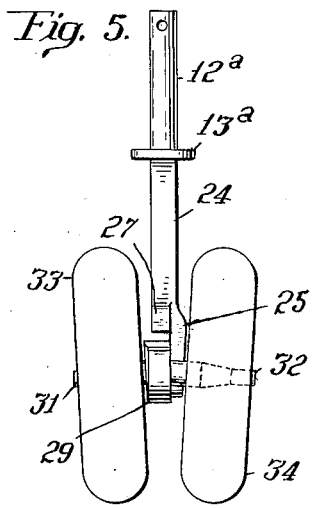
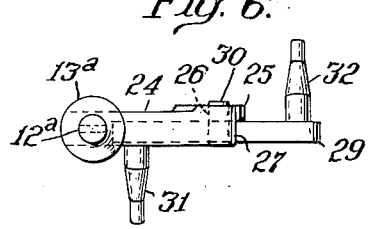
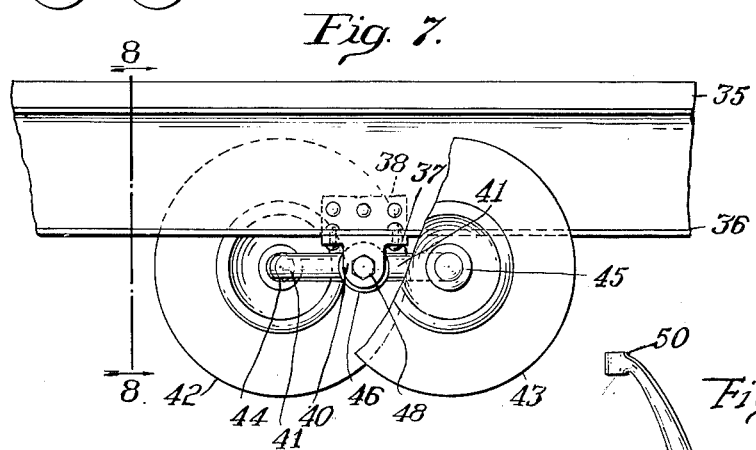
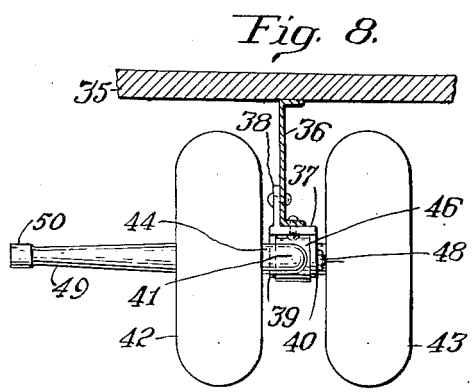
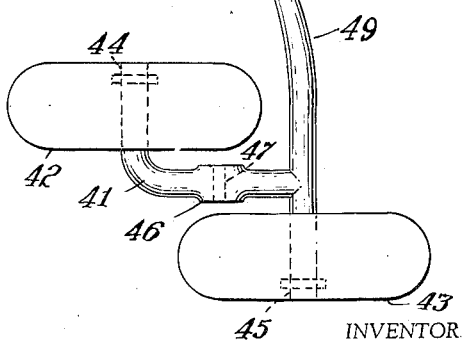
INVENTOR
Richard R. Love

Patented Dec. 2, 1952

2,620,203

UNITED STATES PATENT OFFICE 2,620,203

OSCILLATING WHEEL ASSEMBLY

Richard R. Love, Buhl, Idaho

Application October 28, 1949, Serial No. 124,176

2 Claims. (Cl. 280—104)

The present invention relates to tail wheels for agricultural implements and more particularly to a castering tail wheel assembly which gives improved riding characteristics.

An object of the present invention is to provide a castering tail wheel assembly which is comprised generally of a pair of laterally and longitudinally spaced wheels, preferably of the balloon type, supported in a frame which is swingably mounted in a castering yoke. It will be seen that in this manner all irregular elevations or obstructions encountered by either of the wheels will translate only a partial shock to the implement upon which the implement is mounted.

A further object of the invention is to provide a tail wheel assembly as described above which will allow the wheels and their frame to rotate a complete turn in the event a ditch is encountered thereby allowing the forward wheel to rest in the ditch and the frame and other wheel to pivot thereabouts. In this way the forward wheel becomes the rear wheel and only a small amount of shock is transported to the implement. In this same situation the ordinary single tail wheel would be subject to high stresses and might possibly be broken.

Another object of this invention rests in the provision of a castering tail wheel which is especially designed to traverse corrugated ground. In this design the wheels are longitudinally spaced some distance apart thereby providing a greater distance between the pivotal axis of the wheel frame and the wheels themselves. This too, decreases the vertical movement of the implement maintaining it in a more common plane.

Still another object of the present invention is to furnish a pair of wheels, arranged as already disclosed, on a single Z-shaped axle, the wheels being mounted on the free ends thereof. As a choice of mounting this axle, it may be mounted either to a castering spindle or it may be mounted in a journal box which is rigidly secured to a frame, this latter use of the Z-shaped frame being adapted for mounting on a trailer body or to any implement to be transported.

A still further object of this invention includes the provision of inclined wheels on the above mentioned Z-shaped axle which is mounted on a castering spindle. It will be readily seen that this will prevent the wheels from wandering from side to side.

Still other objects and advantages will become apparent from the following detailed description of the present invention illustrated in the accompanying drawings in which:

Figure 1 is a perspective view of the rear end of an agricultural implement showing a preferred form of the tail wheel mounted thereon;

Figure 2 is a bottom view of the tail wheel of Fig. 1;

Figure 3 is a front view of the tail wheel of Fig. 1.

Figure 4 is a side elevation of a modified form of the invention having various parts of the device broken away;

Figure 5 is a front view of the caster assembly of Fig. 4;

Figure 6 is a plan view of the caster assembly of Fig. 4 with the wheels removed;

Figure 7 is a view of a further modification of the wheel assembly as mounted on a trailer or implement frame;

Figure 8 is a view taken on line 8—8 of Fig. 7;

Figure 9 is a plan view of the Z-shaped axle and its associated wheels of Fig. 7.

Similar reference characters represent similar parts in the several views.

While the castering tail wheel assembly is shown presently as mounted on a side delivery hay rake it will be readily understood by a person skilled in the art that the tail wheel assembly could be applied to other types of implements such as tractor trailing mowers. Also wide use is found on various types of trailers.

In order for farmers to raise crops in arid or irrigated territories, water must be spread evenly over the fields before working the ground and during the entire growing season. This necessitates the plowing of regularly spaced ditches or corrugations, usually about twenty-six inches apart through which water is conducted from high to low sides of field. In much farm work such as mowing, raking, hauling hay and other similar tasks, it is necessary to travel across corrugations which are extremely rough and have a detrimental effect on farm machines.

In mowing hay, for example, across corrugations with the modern high speed tractor mowers, the mower bar begins to bounce over the regularly spaced corrugations and instead of cutting the hay 2 inches from the ground, most of the hay is cut a foot thereabove.

With the present invention the farmer may mow transverse of the corrugations without the mower bar leaving the ground, resulting in more hay harvested per acre and less breakage to the machine. The vertical movement or shock caused by each corrugation, is cut in half by the action of the oscillating mounting. Furthermore, this design affords the resiliency of two pneumatic tires to absorb every shock instead of one.

In designing a tail wheel assembly it is not only essential that it take the corrugations without a major change in the implement plane but also it must be capable of castering. With the present device this is accomplished by placing the pivotal axis of the wheel unit rearwardly of the vertical axis upon which the spindle is swivelly mounted on the implement frame. This gives efficient results in operation and a good following characteristic.

In the preferred form of the invention shown in Figs. 1–3 the usual vertical sleeve 10 is provided on the rear of the implement frame 11. Flanges are furnished at each end of the sleeve to provide greater surfaces for bearing contact of the spindle securing means (not shown). A spindle 12 is adapted to be swivelly received by the sleeve 10 and utilize a flange 13 which forms an abutting means for limiting the descent of the sleeve on the spindle and also to form a bearing means for the lower flange on sleeve 10. A yoke 14 is rigidly secured midway of its ends to the lower end of spindle 12 adjacent the bearing flange 13, the said yoke extending at an obtuse angle relative to the said spindle. At the free ends of the yoke apertures are provided. The wheel mounting assembly 15 is rectangular in shape and is comprised of spaced L-shaped side members 16 and 17 rigidly connected together by shaft members 18 and 19 by any convenient means such as rivets 19a shown in Fig. 2.

The shaft members 18 and 19 are adapted to rotatably mount wheels 20 and 21, respectively. Both of the long arms of L-shaped members 16 and 17 are centrally provided with apertures which are adapted to be placed in alinement with the apertures on the free ends of the yoke, the yoke and wheel frame being pivotally connected together by stud bolts 22 and 23 which are inserted in the aforementioned alined apertures. It will be apparent therefore that as the implement traverses corrugated or undulating ground, only a small amount of the rise and fall will be reflected to the implement.

In the modified form of the invention shown in Figs. 4, 5 and 6 the spindle and bearing flange, illustrated as 12a and 13a are identical to the preferred form of the invention. At the lower end of spindle 12a and adjacent flange 13a an integral frame member 24 is mounted to extend downwardly at an obtuse angle relative to the spindle. At the lower end of the frame member a downwardly projecting offset leg 25 is formed and is provided with an aperture 26. Positioned above aperture 26 a pair of spurs 27 and 28 are formed integral with the frame member 24. A longitudinally extending rocker arm 29 is provided midway of its ends with a stub shaft 30 which is adapted to be pivotally received by aperture 26 in the lower end of frame member 24. At the ends of arm 29 stub shafts 31 and 32 are provided. It will be noted that these shafts extend from opposite sides of arm 29 and are slightly inclined to the horizontal. Wheels 33 and 34 are rotatably mounted on stub shafts 31 and 32, respectively. The operation of this form of castering tail wheel is similar to the preferred form of the invention except that the arm 29 will rock between limits, the spurs 27 and 28 acting as the limiting means.

In Figs. 7, 8 and 9, a form of the invention is shown which is capable of being mounted on a rigid implement beam on a vehicle or trailer body. A body, frame member or standard 35 is shown having one flange of a channel member 36 rigidly secured thereto by means of welding or the like. A journal frame is positioned at the lower end of the channel to provide a mounting support for the ground engaging wheels. The journal frame is formed either as an integral casting or the various parts may be welded together. The frame comprises generally a horizontal plate 37 which is rigidly connected to the lower flange of channel 36, a vertical plate 38 connected at one edge to the plate 37 and secured to the web of channel 36. Extending downwardly from plate 37 a pair of laterally spaced parallel plates 39 and 40 are provided. Apertures are furnished in the lower end of these last named plates and are in axial alinement. An integral Z-shaped axle 41 is utilized to mount wheels 42 and 43, the said wheels being rotatably mounted on the free ends 44 and 45, respectively. Midway of the ends of axle 41 a hub 46 is provided and is furnished with an aperture 47 therein. The hub 46 is adapted to be placed in alinement with the apertures in plates 39 and 40. A bolt 48 is adapted to be received in the said alined apertures thereby rockably mounting axle 41 on the journal frame. The operation of this modification is identical with that of the other modifications insofar as providing smooth traverse over rough or corrugated ground.

It is further contemplated that an inwardly and rearwardly extending torque arm 49 be used to prevent lateral thrust on wheel axles 44 and 45. One end of the torque arm is integral with axle 45. As the arm extends inwardly it tapers to a smaller diameter and terminates in a hub 50 which is furnished with an aperture in transverse alignment with aperture 47 in hub 46. It is to be understood that hub 50 is to be secured to body 35 for oscillation relative thereto. Therefore, the torque arm allows the wheel unit to oscillate and yet prevents lateral thrust of the wheels.

From the foregoing it will be readily apparent that I have devised an invention which is capable of quick assembly and in the event of the breakage of parts, quick and inexpensive replacement may be had. Riding qualities are obtained for the implement that have not heretofore been obtained by the use of single tail wheels.

While a preferred form of the invention has been shown and described, it will be understood that variation in details of form and materials may be made without departure from the invention as defined in the appended claims.

I claim:

1. A supporting wheel assembly for a vehicle frame comprising a standard, a journal frame secured to the lower end of said standard, a generally Z-shaped member, each leg of which forms an axle, swingably mounted intermediate its ends in the journal frame, longitudinally and laterally spaced wheels mounted on the axle members, one of the legs of said member having an extension forming a torque arm extending transversely of said member and being formed at one end thereof for pivotal attachment to the vehicle frame on an axis substantially in alignment with the axis of mounting of said Z-shaped member in said journal box.

2. A supporting wheel assembly for a vehicle frame comprising a journal frame attachable to said vehicle frame, an integral generally Z-shaped member swingably mounted intermediate its ends in the journal frame, the free ends of said member comprising axles spaced from said journal frame, wheels rotatably mounted on said axles, and a rigid torque arm integral with one of said axles extending laterally from said member, said torque arm having an inner end formed for pivotal attachment to the vehicle frame, said inner end being disposed in a vertical plane substantially in alignment with the vertical plane passing through the axis of mounting of said member in said journal frame.

RICHARD R. LOVE.

REFERENCES CITED

The following references are of record in the file of this patent:

UNITED STATES PATENTS

| Number | Name | Date |
|---|---|---|
| 292,851 | Potter | Feb. 5, 1884 |
| 306,997 | Barnes | Oct. 21, 1884 |
| 1,571,748 | Wilson | Feb. 2, 1926 |
| 2,194,323 | Peterman | Mar. 19, 1940 |
| 2,197,265 | Coultas et al | Apr. 16, 1940 |
| 2,239,849 | Judd | Apr. 29, 1941 |
| 2,488,002 | Carraher | Nov. 15, 1949 |